April 14, 1942.  C. C. FARMER  2,279,452
BRAKE CONTROL MEANS
Filed May 31, 1940   3 Sheets-Sheet 3

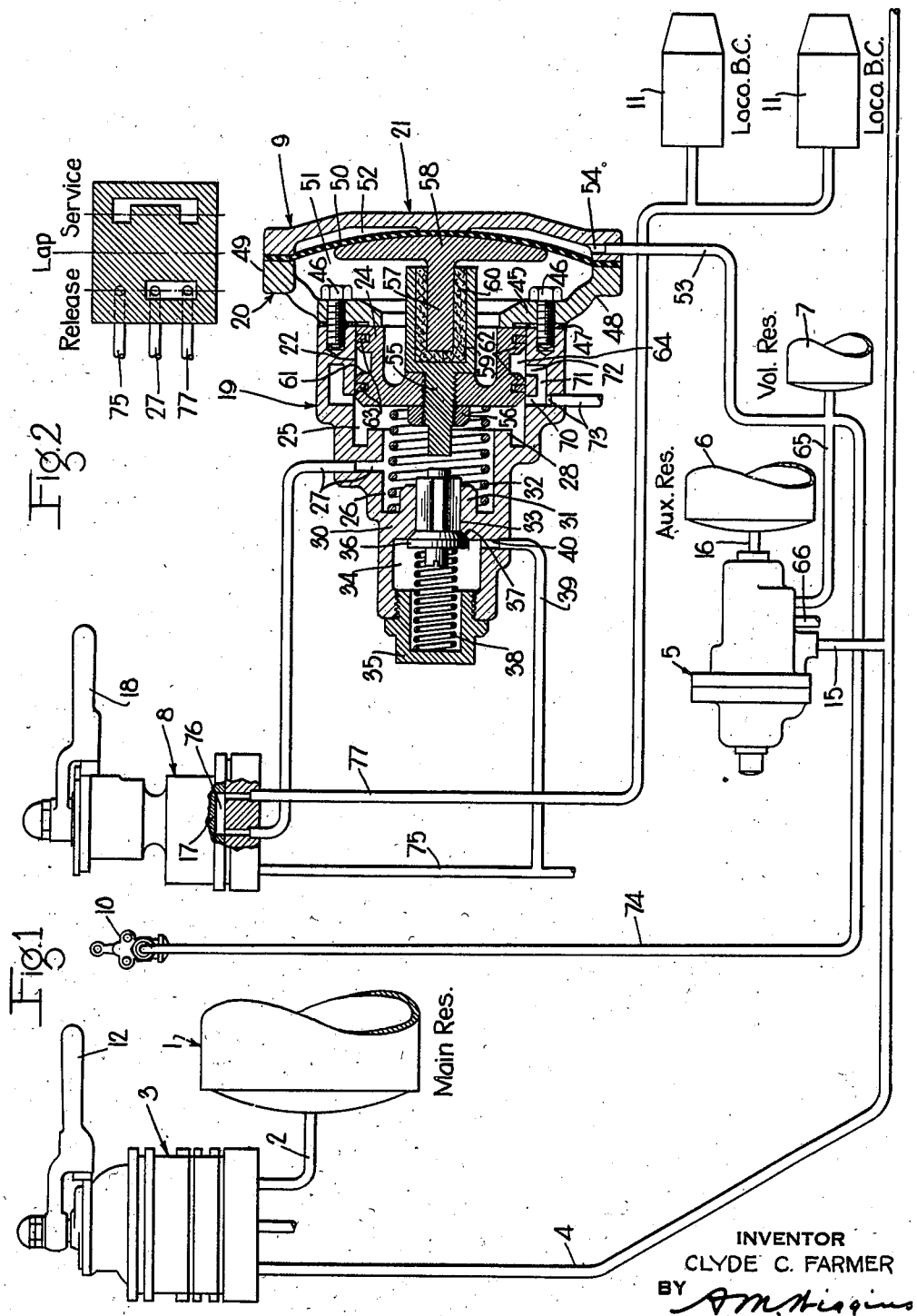

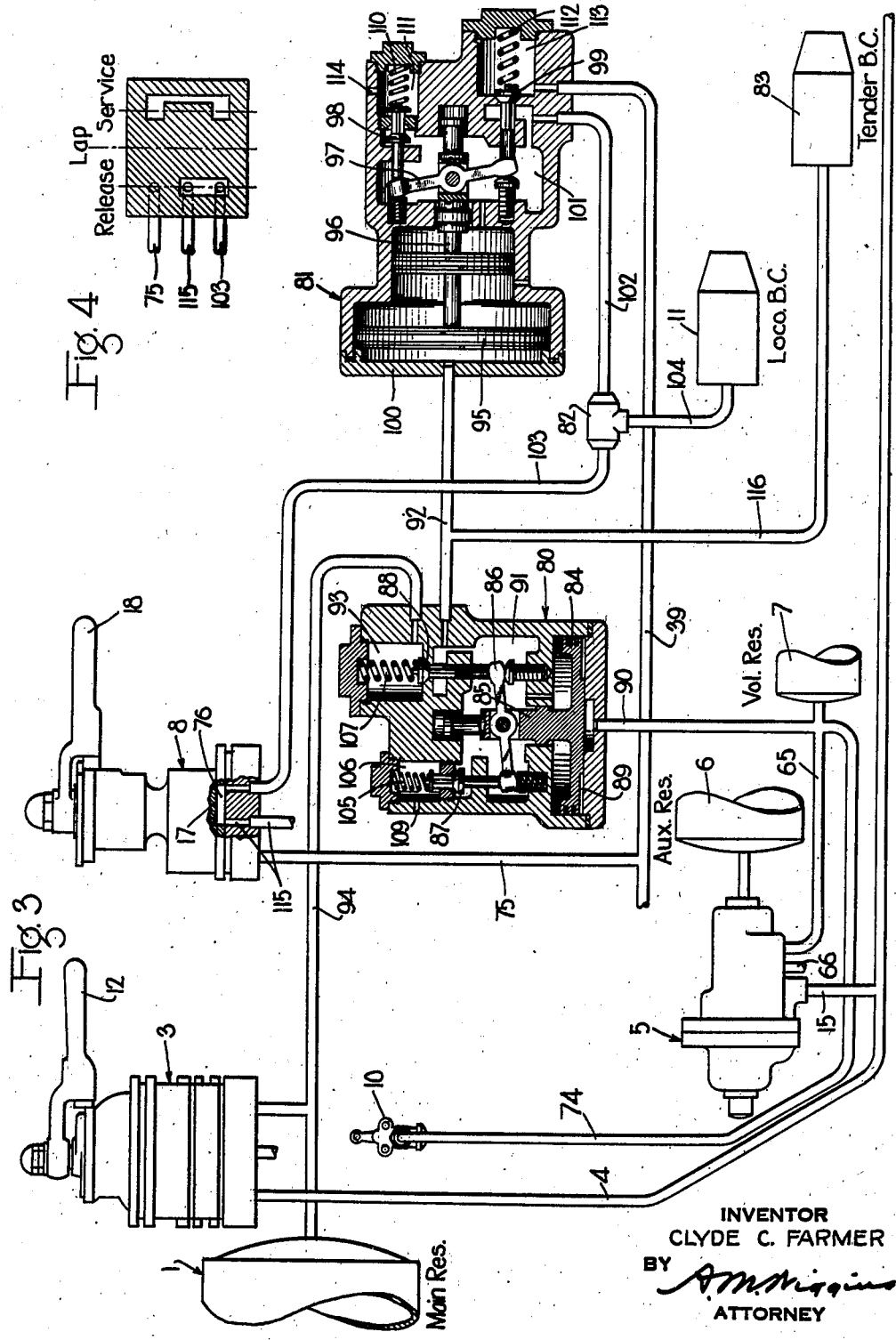

INVENTOR
CLYDE C. FARMER
BY
ATTORNEY

Patented Apr. 14, 1942

2,279,452

UNITED STATES PATENT OFFICE 2,279,452

BRAKE CONTROL MEANS

Clyde C. Farmer, Pittsburgh, Pa., assignor to The Westinghouse Air Brake Company, Wilmerding, Pa., a corporation of Pennsylvania Application May 31, 1940, Serial No. 337,983

24 Claims. (Cl. 303—2)

This invention relates to fluid pressure brakes and more particularly to fluid pressure brake equipment for railway vehicles.

Some types of locomotives now in service are equipped with brake control equipment of the type in which steam is used for independent control of the locomotive brakes. However, many of these locomotives are not equipped for properly controlling either passenger or freight cars provided with pneumatically controlled brake equipments which operate on the well known automatic principal; and they also further have no automatic control for steam brakes on the locomotive.

In order that locomotives so equipped may be used to haul trains of passenger or freight cars having automatic air brake equipment, and to properly control the brakes on the locomotive and the cars throughout such a train, it will be apparent that some suitable mechanism must be employed for the proper automatic control of both the locomotive steam brakes and the pneumatic car brakes.

Accordingly the principal object of the invention is to provide fluid pressure brake apparatus having means for automatically controlling, jointly, the air brakes on a train of cars and the steam brake on a locomotive. A further object is to provide novel independent control of the steam brakes on the locomotive.

Another object of the invention is to provide an air pressure responsive brake control mechanism which is operative to jointly control air brake equipment on the cars of a train and a steam brake on the locomotive.

According to the invention these objects are attained by providing an automatic air brake apparatus on the locomotive which is adapted to control the automatic air brake equipment on the cars of a train, and which is also adapted to control an air pressure responsive steam relay valve device to effect the operation of the steam brakes on the locomotive.

In accordance with modifications of the present invention the above objects may be attained by providing an automatic air brake apparatus on the locomotive which is adapted to control the automatic air brake equipment on the cars of a train and also adapted to control an air pressure responsive relay mechanism which functions to effect operation of steam brakes on the driving wheels of a locomotive and air brakes on the locomotive tender wheels.

Other objects and advantages will appear in the following detail description of the invention, which is illustrated by the accompanying drawings, wherein:

Fig. 1 is a diagrammatic view partly in section of a brake apparatus embodying one form of the invention.

Fig. 2 is a diagrammatic view in section showing the connections established when the independent brake valve of the apparatus shown in Fig. 1 is in application position.

Fig. 3 is a diagrammatic view partly in section of a brake apparatus embodying a modification of the invention.

Fig. 4 is a diagrammatic view in section showing the connections established when the independent brake valve of the apparatus shown in Fig. 3 is in application position.

Figure 5:
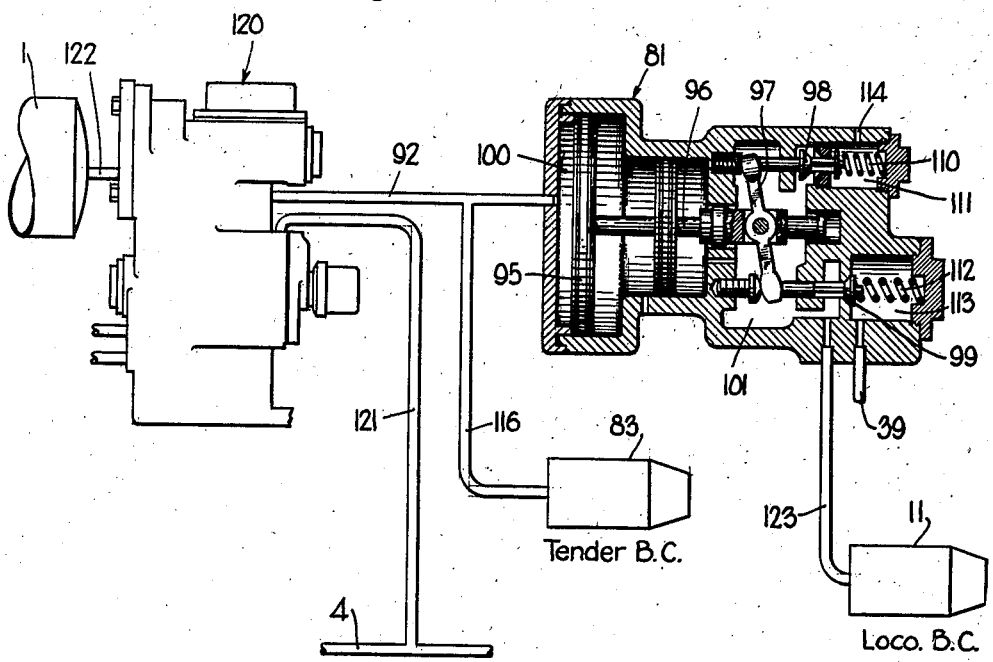
Fig. 5 is a partial view, partly in section, of a brake apparatus embodying another modification of the invention.

As shown in Fig. 1 of the drawings, the brake equipment comprises a main reservoir 1, a main reservoir pipe 2, an engineer's automatic brake valve device 3, a brake pipe 4 which may be connected in the usual manner to the car brake pipe extending throughout the length of the train, a brake controlling valve device 5, an auxiliary reservoir 6, a volume reservoir 7, an independent brake valve device 8, a relay valve device 9, an independent release valve 10, and two locomotive steam brake cylinders 11 of the usual well known type.

Considering now more in detail the devices referred to above, the main reservoir 1 which is of usual construction is adapted to be supplied with fluid under pressure in any suitable manner and is connected to the automatic brake valve device 3, by means of main reservoir pipe 2.

The engineer's automatic brake valve device 3 may be of the usual well known construction comprising a casing having a rotary valve chamber therein in which is mounted a rotary valve which is operated by means of a handle 12 for causing either an increase or a decrease in the pressure of fluid in the brake pipe 4 for effecting either an application or a release of the brakes on the cars throughout a train and the brakes on the locomotive.

The brake controlling valve device 5 may be substantially the same construction as the well known plain automatic triple valve device, and is adapted to be controlled from the automatic brake valve device 3. Since this type of valve device is so well known it may be described as comprising a casing having a piston chamber connected to the brake pipe 4, through a brake pipe branch pipe 15, and containing a piston having a stem for operating a slide valve which is contained in a slide valve chamber which is connected to the auxiliary reservoir 6 by way of a pipe 16.

It will be understood that this mechanism operates, as will hereinafter more fully appear, upon a reduction in brake pipe pressure to supply fluid under pressure from the auxiliary reservoir 6 to effect the operation of the relay valve device 9 to initiate an application of the locomotive steam brakes and upon an increase in brake pipe pressure to effect a release of the locomotive brakes and to charge the auxiliary reservoir.

The independent brake valve device 8 is of the usual construction and comprises a casing having a chamber in which there is mounted a rotary valve 17 adapted to be turned to the various brake operating positions by an operating handle 18 for effecting operation of the steam brakes on the locomotive.

The independent release valve 10 for the purpose of illustration is shown as a car discharge valve of the well known type used in train air signal systems shown and described in Westinghouse Air Brake Company's Instruction Pamphlet No. 5061, dated March, 1939. In view of this it may be briefly described as comprising a handle which when moved in either direction from a vertical position actuates a spring weighted valve, which when open is adapted to vent a pipe 74 to the atmosphere.

The relay valve device 9, which is provided for controlling the application and release of the steam brakes on the locomotive during operation of the automatic brake valve device 3, comprises a body section 19, a bracket section 20 and a cover section 21. The body section 19 has formed therein a cylinder 22 containing a piston member 24. At the inner face of the piston member 24 there is a chamber 25 which is open to a chamber 26 of smaller diameter than chamber 25 which is open to the independent brake valve device 8 by way of a passage and pipe 27. The chamber 26 is bounded by the inner wall of the body casing which wall is so arranged as to provide an annular flange 28 which extends into the chamber 25 so as to form a stop for the piston member 24 in its movement toward the left.

The end wall 30 of the chamber 26 is provided with an annular boss or shoulder 31 which extends into chamber 26. Interposed between and operatively engaging the inner surface of the end wall and the inner face of the piston member 24 is a spring 32, which spring at all times tends to urge the piston member 24 to the position in which it is shown in Fig. 1 of the drawings.

The end wall 30 of the chamber 26 is provided with a passage 33 which extends through the boss 31 and leads from the chamber 26 to a chamber 34 which is open to a pipe 39 by way of a passage 40. This chamber 34 is provided with an open end which is normally closed by a closure cap 35 having screwthreaded engagement with the body section of the casing. The passage 33 may be closed by a valve 36 which valve is adapted to seat on a valve seat 37 formed on one side of the end wall 30. Contained in chamber 34 is a spring 38 which is provided for urging the valve 36 into engagement with its seat 37.

The bracket section 20 is provided with an annular flange portion 45 which is secured to the body section 19 by means of cap screws 46, there being an asbestos gasket 47 interposed between the sections 19 and 20. The flange portion 45 extends a short distance inwardly beyond the surface of the wall of the cylinder 22 and thereby forms a stop for limiting the travel of the piston member 24 in its movement toward the right, as viewed in Fig. 1 of the drawings. Extending outwardly from the annular flange portion 45 are a number of spaced ribs 48 which at their ends are connected to a circular flange 49 to which is secured in any suitable manner the cap section 21.

Clamped between cap section 21 and the flange 49 of the bracket section 20 is a flexible diaphragm 50, having at one side a chamber 51 open to the atmosphere through the spaces between the ribs 48 and at the other side a chamber 52 open to a pipe 53 by way of a passage 54.

The piston 24 is provided with a stem 55 which extends through a central opening in the piston and has screw-threaded connection with the piston, the stem being locked against accidental turning by a lock nut 56. One end of the stem terminates a short distance beyond the nut 56 and is adapted to operate the valve 36. The other end of the stem extends from the piston member into the chamber 51 and is provided with a bore 59 which is open at one end for the reception of a stem 57 formed integral with a diaphragm follower 58 which is contained in the chamber 51, which follower 58 is in operative engagement with the diaphragm 50. The follower stem 57 is of less diameter than the bore 59 provided in the piston stem 55 and the space between the follower stem 57 and wall of the bore 59 is taken up by an asbestos filler piece or packing 60, or any other heat insulating material, for preventing excessive heat from being transmitted from the piston stem to the follower and thereby to the diaphragm. With the chamber 51 open to the atmosphere and the connection between the piston stem and the follower stem being heat insulated, the diaphragm 50 will not be subjected to excessive heat.

The piston member 24 comprises two joined but spaced pistons 62 grooved to receive piston rings 63 which are adapted to slidably contact with the walls of the cylinder 22. These pistons are connected together by means of a cylindrical portion 61 which is of less diameter than the pistons. These pistons together with the wall of the cylinder 22 and the outside wall of the cylindrical portion 61 define an annular leakage chamber 64 which is normally connected to the atmosphere by way of port 72, cavity 71 and passage and pipe 73 as shown in Fig. 1.

OPERATION

*Charging of the equipment*

Assuming that the main reservoir 1 is charged with fluid under pressure, the equipment illustrated in Fig. 1 of the drawings will be charged as follows:

In charging the equipment the operating handle 12 of the automatic brake valve device 3 will be placed in either release position or in running position as is usual. In either of these release positions, fluid under pressure is supplied from the main reservoir 1 to the brake pipe 4, by way of main reservoir pipe 2 and through the usual brake pipe charging ports and passages in the automatic brake valve device 3.

Fluid under pressure thus supplied flows from the brake pipe 4, through branch pipe 15 to the piston chamber of the brake controlling valve device 5, causing the usual operating mechanism of the valve device to be moved to release position. In this position the operating mechanism of the valve device functions in the usual manner to supply fluid under pressure from the branch pipe 15 to the auxiliary reservoir 6 in the usual well known manner; thus charging the reservoir to the pressure normally carried in the brake pipe. With the operating mechanism in this position, the usual exhaust cavity in the slide valve thereof connects a pipe 65 leading from the volume reservoir 7 to an exhaust pipe 66 leading from the control valve device 5, thus connecting the volume reservoir to the atmosphere. Since the passage 54 and connected pipe 53 is in constant open communication with the pipe 65, the diaphragm chamber 52 is also connected to the atmosphere. The pipe 74 leading to the independent release valve 10 is also connected to the atmosphere, by way of pipe 65.

Since the diaphragm chamber 52 of the relay valve device 9 is at atmospheric pressure, the pressure of the spring 32 contained in chamber 26 and acting on one side of the left hand piston 62, as viewed in Fig. 1, is sufficient to maintain the piston member 24 and diaphragm 50 in the position in which they are shown in Fig. 1 of the drawings. In this position the piston member 24 is in engagement with the stop 45 and the diaphragm 50 is flexed toward the right as shown.

With the piston and diaphragm assembly of the relay valve device 9 positioned as above described, the chamber 25 at the inner face of the piston 62 at the left hand end of the piston member 24 is connected to the atmosphere, by way of port 70 and cavity 71 formed in the body section 19 of the casing and exhaust passage and pipe 73. Under these conditions the spring 38 contained in chamber 54 acts to maintain the valve 36 in seating engagement with its seat 37, as shown, cutting off communication between chambers 26 and 34, by way of passage 33.

At this time the handle 18 of the independent brake valve device 8 will be in release position, in which position a pipe 75 leading from any suitable source of steam supply (not shown) is blanked by the rotary valve 18, as shown in Fig. 2 of the drawings. Steam supplied to pipe 75 flows therefrom through connected pipe 39 to the chamber 34 in the relay valve device 9 the pressure of which acts with the spring 38 to maintain the valve 36 closed.

With the rotary valve 18 of the independent brake valve in this position a cavity 76 therein connects the pipe 27 leading from the chamber 26 of the relay valve device 9 to a pipe 77 leading from the brake cylinders 11. Therefore the brake cylinders 11 are connected to the atmosphere by way of pipe 77, cavity 76, pipe 27, passage 28, chambers 26 and 25, port 70, cavity 71 and passage and pipe 72, so that the brakes are maintained released.

*Automatic application of the brakes*

Upon a reduction of brake pipe pressure, effected in the usual manner by means of the automatic brake valve device 3 and with the independent brake valve device 8 in release position as above described, the operating mechanism of the brake controlling valve device 5 operates in the usual well known manner to first cut off communication between pipes 65 and 66 and to then establish communication between the auxiliary reservoir 6 and the pipe 65. With the latter communication established fluid under pressure flows from the auxiliary reservoir 6 to the volume reservoir 7 and consequently to the connected pipe 74 which leads to the independent release valve 10, and connected diaphragm chamber 52. Fluid under pressure thus supplied to the chamber 52 causes the diaphragm 50 to flex toward the left and, through the medium of the diaphragm follower and follower stem and piston stem, the piston member 24 is moved toward the left against the opposing action of the spring 32, until the end of the piston stem 55 engages the valve 33. When the piston member 24 reaches this position, the innermost piston ring 63 at the left hand end of the piston member will blank the port 70, thus cutting off communication from chamber 25 to the atmosphere. With the further development of pressure, say six to seven pounds, in the diaphragm chamber 52, the diaphragm and piston assembly will be caused to move further toward the left moving the valve 36 out of engagement with its seat 37 against the opposing action of the spring 38. With valve 36 unseated, steam under pressure flows past the unseated valve and through chamber 26 from chamber 34 to the locomotive steam brake cylinders 11 to effect an application of the brake, the communication from chamber 26 to the brake cylinders being established through passage and pipe 27, cavity 76 in the rotary valve of the independent brake valve device and pipe 77.

When the steam pressure in the brake cylinders 11 and in the connected relay valve chambers 26 and 25 acting on the innermost or left-hand face of the piston member 24 has been increased sufficient to overcome the pressure of air acting in the diaphragm chamber 52, the valve 36 will be moved to its seated position and through the medium of the piston stem 55 the piston member 24 and diaphragm assembly will be shifted to the right to its lap position by the spring 38. With the piston member 24 and the diaphragm in lap position the piston member 24 maintains the port 70 which leads to the exhaust passage and pipe 73 closed. The locomotive brakes are thus held applied to the attained degree of brake cylinder pressure.

It should be mentioned at this time that the purpose of the volume reservoir 7 is to limit the pressure which may be developed in the diaphragm chamber 52 and consequently in the locomotive brake cylinders 11 during an automatic application of the brakes. It will be noted that the area of the diaphragm 50 differs from that of the piston 62 at the left hand end of the piston member 24 so that the desired relation of steam brake cylinder pressure in the cylinders 11 to the air pressure developed in the volume reservoir 7 and diaphragm chamber 52 may be obtained. Therefore the locomotive braking force is controlled automatically according to the braking force of the cars throughout the train during automatic brake operation.

Although no car equipment is shown the usual air brake equipment on the cars throughout a train will operate on the well known automatic principle. With this in mind it will be obvious that the automatic brake valve device 3 will operate to control air brakes on the cars throughout the train in the usual well known manner as well as the locomotive steam brakes.

*Release after an automatic application of the brakes*

If it is desired to release the brakes on the locomotive and on the cars of a train after an automatic application, the operating handle 12 of the automatic brake valve device 3 is turned to either release or running position. With the handle 12 turned to either of these positions, fluid under pressure from the main reservoir is supplied to the brake pipe causing the operating mechanism of the brake controlling valve device 5 to move to release position. When this occurs the volume reservoir 7, the pipe leading to the car discharge valve 10 and the connected diaphragm chamber 52 are vented to the atmosphere as hereinbefore described in connection with the charging of the equipment. With the diaphragm chamber 52 vented, the spring 32 will move the piston and diaphragm assembly to the position shown in Fig. 1 of the drawings, in which position the steam pressure in the brake cylinders 11 will be released to the atmosphere, by way of pipe 77, cavity 76 in the rotary valve 17 of the independent brake valve device 8, pipe and passage 27, chambers 26 and 25 in the relay valve device 9, port 70, cavity 71 and pipe and passage 73.

*Independent release of locomotive brakes after an automatic service application of the train brakes*

After the train brakes are applied by a reduction in brake pipe pressure, the operator may desire to release the brakes on the locomotive independently of those on the train, in order to avoid overheating of the driver wheels. This independent release of the locomotive brakes is accomplished by moving the handle of the independent release valve 10 either to the right or to the left of its normal vertical position, in either of which position the usual spring weighted valve of the device 10 is unseated. With this valve unseated fluid under pressure in pipe 74, connected volume reservoir 7 and connected diaphragm chamber 52 are vented to the atmosphere. As the pressure of fluid in chamber 52 reduces due to such venting, the combined pressures of the spring 32 and of the steam in chamber 25, acting on the left hand end of the piston member 24, moves the piston and diaphragm assembly to the position in which they are shown in Fig. 1 of the drawings. When this occurs steam pressure in the brake cylinders 11 will be released to atmosphere by way of pipe 77, through the independent brake valve device 8 and the relay valve device 9, as before described.

During this independent release of the locomotive brakes there is no change in the brake pipe pressure and consequently the fluid pressure brake equipments on the cars of the train will remain applied.

If it is desired to effect an independent application of the brakes on the locomotive or to reapply the locomotive brakes after effecting an independent release thereof, the handle 18 of the independent brake valve device 8 is moved to application position. In this position the rotary valve 17 establishes communication between pipes 75 and 77 and blanks pipe 27. With the communication between pipes 75 and 77 established, steam pressure flows from the steam supply pipe 75 to the brake cylinder 11, by way of pipe 75, through the independent brake valve 8 to pipe 77 to effect the application of the locomotive brakes. If the locomotive and train brakes are applied lightly by an automatic brake application as hereinbefore described and it is desired to increase the braking force on the locomotive without effecting the train brakes, the handle 18 of the independent brake valve device 8 is moved to application position. In this position, steam under pressure is supplied to the brake cylinders 11, as above described, to increase the pressure therein, the increase in pressure resulting in increased braking force on the locomotive. Since there is no change in the pressure of fluid acting in the brake pipe, there will be no increase in braking force on the cars throughout the train.

If it is desired to retain the locomotive brakes applied while releasing the train brakes, the handle 18 of the independent brake valve device 8 is moved to lap position, before moving the handle 12 of the automatic brake valve device 3 to either release or running position. With the independent brake valve device in lap position, the rotary valve 17 therein blanks or cuts off all communication through the brake valve, as will be obvious from an inspection of Fig. 2 of the drawings. Under these conditions, when the piston and diaphragm assembly of the relay valve device 9 moves to release position, as shown in Fig. 1 of the drawings, due to an increase in brake pipe pressure effected by operation of the handle 12 of the automatic brake valve device 3 to either release or running position, as before described, the locomotive brakes will remain applied, since rotary valve 17 in the independent brake valve device 8 cuts off communication between pipe 77 and pipe 27, thereby trapping the pressure in the brake cylinders 11.

*Embodiment shown in Fig. 3*

The embodiment of the invention illustrated in Fig. 3 of the drawings is similar in many respects to the embodiment shown in Fig. 1. However, it differs therefrom in that it is adapted to control the pneumatic brakes on the tender of the locomotive and in that a different type of steam relay valve device is used for controlling the locomotive steam brakes.

As shown in Fig. 3 of the drawings, the brake equipment comprises the following valve devices and other parts which are the same as shown in Fig. 1 and which are correspondingly numbered: a main reservoir 1, an engineer's brake valve device 3, a brake pipe 4, a brake controlling valve device 5, an auxiliary reservoir 6, a volume reservoir 7, an independent brake valve device 8, an independent release valve device 10, and one locomotive steam brake cylinder 11. In addition, this equipment comprises a pneumatic relay valve device 80 for controlling the pneumatic brakes on the locomotive tender and for also controlling the operation of a steam relay valve device 81, a double check valve device 82 and a pneumatic tender brake cylinder 83 of the usual well known type.

The pneumatic relay valve device 80 is of the type shown, described and claimed in Patent No. 2,096,491 of E. E. Hewitt, issued October 19, 1937, and assigned to the assignee of the present application. Briefly described it comprises an operating piston 84 having a piston stem 85 provided with a rockable arm 86 which is adapted to control the operation of an exhaust valve 87 and a supply valve 88. One face of the operating piston 84 is subject to the pressure of fluid in a chamber 89 which may be supplied to the chamber through a pipe 90, and is subject on the other side to the pressure of fluid in a chamber 91 which is in constant open communication with a brake cylinder control pipe 92. The device is further provided with a supply chamber 93 which is in constant open communication with the main reservoir 1 by way of a main reservoir pipe 94.

The steam relay valve device 81 is similar in construction to the pneumatic relay valve device 80 above described and may be briefly described as comprising an operating piston 95 having a piston stem 96 provided with a rockable lever 97 which is adapted to control the operation of an exhaust valve 98 and a supply valve 99. The operating piston 95 is responsive to the pressure of fluid in a chamber 100 which may be supplied to the chamber through the brake cylinder control pipe 92. The supply valve 99 and the exhaust valve 98 control the supply to and release of steam under pressure to and from a chamber 101 which is in open communication with one side of the double check valve device 82, by way of a pipe 102. The device is further provided with a steam supply chamber 113 which is in constant open communication with the steam supply pipe 39.

The double check valve device 82 is of conventional construction comprising a casing connected at one end to the pipe 102 as above described. At the other end of the check valve device the casing is connected to a pipe 103 leading from the independent brake valve device 8. At an intermediate point the casing is connected to a pipe 104 leading from the locomotive steam brake cylinder 11.

OPERATION OF THE EMBODIMENT SHOWN IN FIG. 3

*Charging of the equipment*

Assuming that the main reservoir 1 is charged with fluid under pressure, the equipment illustrated in Fig. 3 of the drawings will be charged by operation of the engineer's brake valve device 3 and the brake controlling valve device 5 in exactly the same manner as the equipment shown in Fig. 1, since the brake valve device 3 and the brake controlling valve device 5 are exactly the same as in that embodiment, it being understood that at this time the handle 18 of the independent brake valve device 8 will be in release position as is the case in the embodiment shown in Fig. 1.

For simplicity, therefore, only so much of the operation of the embodiment shown in Fig. 3 will be specifically described as is necessary to understand the differences over the embodiment illustrated in Fig. 1.

Assuming, therefore, that the auxiliary reservoir 6 is charged with fluid under pressure and the volume reservoir 7 is connected to the atmosphere by way of pipe 65, through the brake controlling valve device 5 and pipe 66, as before described, the connected pipe 90 and consequently the piston chamber 89 of the pneumatic relay valve device 80 will also be at atmospheric pressure so that the piston 84 of the relay valve device 80 will be in its release position, as shown in Fig. 3 of the drawings. With the piston 84 in this position, the pressure of a spring 105, which spring is contained in an exhaust chamber 106, acts to maintain the exhaust valve 87 unseated and the pressure of a spring 107, contained in the supply chamber 93, acts to maintain the supply valve 88 seated. With the valves 87 and 88 thus positioned, the chamber 91 at the opposite side of the piston 84 is open to the atmosphere past unseated exhaust valve 87 through exhaust chamber 106 and exhaust port 109. With the supply valve 88 seated, communication between the supply chamber 93 and the chamber 91 is cut off.

Since the chamber 91 of the relay valve device 80 is at atmospheric pressure the brake cylinder control pipe 92 and consequently the piston chamber 100 of the steam relay valve device 81 will be at atmospheric pressure. The pipe 116 leading from the tender brake cylinder 83 being connected to the pipe 92 is also at atmospheric pressure so that the tender brakes are released.

Since the piston chamber 100 of the steam relay valve device 81 is at atmospheric pressure, the piston 95 will be in release position, as shown in Fig. 3 of the drawings. With the piston 95 in this position, the pressure of a spring 110, contained in a steam exhaust chamber 111, acts to maintain the exhaust valve 98 unseated and the pressure of a spring 112, contained in the steam supply chamber 113, acts to maintain the supply valve 99 seated. With the valves 98 and 99 thus positioned, the chamber 101 is open to the atmosphere past unseated valve 98 through exhaust chamber 111 and exhaust port 114, and the valve 99 cuts off communication between chambers 101 and 113.

Since the chamber 101 of the steam relay valve device 81 is at atmospheric pressure the connected pipe 102 leading to one side of the double check valve device 82 is at atmospheric pressure. With the independent brake valve in release position as shown, the pipe 103 at the other side of the check valve 82 is also connected to the atmosphere by way of cavity 76 in the rotary valve 17 of the independent brake valve device 8 and a passage and pipe 115. Therefore, since the pipes 102 and 103 at either side of the check valve 82 are connected to the atmosphere, the pipe 104 leading from the steam brake cylinder 11 is connected to the atmosphere through one or the other of the pipes 102 or 103, as the case may be, and the locomotive steam brakes are maintained released.

AUTOMATIC APPLICATION OF THE BRAKES OF THE EMBODIMENT SHOWN IN FIG. 3

When it is desired to effect an automatic application of the brakes, brake pipe pressure is reduced in the usual manner causing the operating mechanism of the brake controlling valve device 5 to move to application position, in which position fluid under pressure is supplied from the auxiliary reservoir 6 to the volume reservoir 7 in exactly the same manner as hereinbefore described. Under these conditions fluid under pressure also flows to the piston chamber 89 of the pneumatic relay valve device 80, by way of pipe 90, causing the operating piston 84 to move upwardly from the position in which it is shown in the drawings to its application position. In so doing the exhaust valve 87 is seated, cutting off communication between chamber 91 and the atmosphere, and the supply valve 88 is unseated. With the supply valve 88 unseated fluid under pressure flows past unseated valve 88 from supply chamber 93, through chamber 91, to the piston chamber 100 of the steam relay valve device 81, by way of control pipe 92, causing the piston 95 of the steam relay valve device 81 to move to application position. At the same time fluid under pressure flows from the brake cylinder control pipe 92 to the tender brake cylinder 83, by way of pipe 116, to effect an application of the pneumatic tender brakes.

The piston 95 in its movement to application position causes the exhaust valve 98 to be seated and the supply valve 99 to be unseated. With the exhaust valve 98 seated communication between chamber 101 and the atmosphere is cut-off. With the supply valve 99 unseated steam under pressure flows from chamber 113 past the unseated valve and through chamber 101 to pipe 102. The steam under pressure supplied to pipe 102 moves the valve contained in the check valve device 82, so as to establish communication between the pipes 102 and 104 through which the steam then flows to the steam brake cylinder 11 to effect an application of the steam brakes on the driver wheels of the locomotive. With the valve of the check valve 82 in this position communication between the pipe 102 and the pipe 103 is cut-off.

When fluid under pressure in the tender brake cylinder 83, and consequently in the piston chamber 91 of the pneumatic relay valve device 80 acting on the upper face of the piston 84 has been increased to a degree slightly exceeding the pressure of fluid in the chamber 89, the piston 84 and associated supply and exhaust valves in the pneumatic relay valve device will be moved to their seated or lap positions.

Under these conditions the further supply of fluid under pressure to the chamber 100 and to the tender brake cylinder 83 will be cut off, and the tender brakes of the locomotive are held applied with a brake cylinder pressure corresponding to the pressure called for by the operation of the brake valve device 3. At the same time steam under pressure in the locomotive driver brake cylinder 11 and connected chamber 101 will be increased until the pressure of the steam acting therein is sufficient to overcome the pressure of fluid in the chamber 100. When this occurs the piston 95 and associated valve mechanism of the steam relay valve device 81 will be moved to their seated or lap positions. With both valves seated, the locomotive driver brakes are held applied with a brake cylinder pressure determined by the pressure of fluid in chamber 100.

This equipment like the equipment shown in Fig. 1 is adapted to control the usual air brakes on the cars throughout a train.

RELEASE AFTER AN AUTOMATIC APPLICATION OF THE BRAKES OF THE EMBODIMENT SHOWN IN FIG. 3

When it is desired to release the brakes on the locomotive and on the cars of a train after an automatic application, with the equipment shown in Fig. 3, the brake valve device 3 will be manipulated to effect an increase in brake pipe pressure and thereby cause the operating mechanism of the brake controlling valve device 5 to move to release position in exactly the same manner as described in connection with the equipment shown in Fig. 1. When the operating mechanism of the control valve device 5 has moved to release position the volume reservoir 7 and the connected chamber 89 of the relay valve device 80 are vented to the atmosphere as hereinbefore described in connection with the charging of the equipment. With the chamber 89 vented, the piston 84 and associated exhaust and supply valve mechanism of the relay valve device will move to release position as shown in Fig. 3 of the drawings. With this relay valve device in release position fluid under pressure in the tender brake cylinder 83 will be released to the atmosphere by way of pipe 116, pipe 92, chamber 91, past unseated exhaust valve 87, exhaust chamber 106 and exhaust port 109. At the same time fluid under pressure in chamber 100 of the steam relay valve device 81 is released by way of pipe 92 and the connected circuit just traced through the pneumatic relay valve device 80. Upon the release of fluid under pressure from the chamber 100 of the steam relay valve device, the piston 95 and associated exhaust and supply valve mechanism are moved to release position, in which the supply valve 99 is seated and the exhaust valve 98 is unseated as hereinbefore described. Under these conditions steam under pressure in the steam brake cylinder 11 will be released to the atmosphere by way of pipe 104, through check valve device 82, pipe 102, chamber 101, past unseated exhaust valve 98 through exhaust chamber 111 and exhaust port 114.

INDEPENDENT RELEASE OF LOCOMOTIVE BRAKES AFTER AN AUTOMATIC SERVICE APPLICATION OF THE TRAIN BRAKES OF THE EMBODIMENT SHOWN IN FIG. 3

Release of the brakes on the locomotive independently of those on the train with the equipment shown in this embodiment is initiated, by the use of the independent release valve 10 in exactly the same manner as described in connection with independent release of the locomotive brakes in the equipment shown in Fig. 1. When the release is initiated fluid under pressure in chamber 89 of the relay valve device 80 is vented by way of pipe 90, connected pipe 94, through the independent release valve 10 to the atmosphere. When this occurs the piston 84 and the associated valve mechanism of the relay valve device 80 move to release position, thereby venting fluid under pressure from the tender brake cylinder 83 to the atmosphere to effect a release of the tender brakes, by way of pipe 116, connected pipe 92 and through the relay valve device 80 as hereinbefore described. At the same time fluid under pressure is vented from chamber 100 of the steam relay valve device 81 by way of pipe 92 and through the relay valve device 80 causing movement of the piston 95 and associated valve mechanism of the steam relay valve device 81 to release position. With the valve mechanism of the steam relay valve device 81 in release position, steam is vented from the brake cylinder 11 by way of pipe 104, through check valve device 82, pipe 102 and through the steam relay 81 to the atmosphere.

During this independent release of the locomotive brakes there is no change in the brake pipe pressure and consequently the fluid pressure brake equipments on the cars of the train will remain in application position.

In order to effect an independent application of the driver brakes on the locomotive or to reapply the locomotive brakes after effecting an independent release thereof, with the equipment shown in Fig. 3 of the drawings, the handle 18 of the independent brake valve 8 is moved to application position, which is exactly the same procedure followed in connection in the equipment shown in Fig. 1 of the drawings. However, in this equipment with the rotary valve 17 of the independent brake valve device 8 in application position, the cavity 76 in the rotary valve establishes communication between steam supply pipe 75 and the pipe 103, as may be seen by an inspection of Fig. 4 of the drawings. With this communication established steam is supplied to the steam brake cylinder 11 by way of supply pipe 75, cavity 76 in the rotary valve 17 of the independent brake valve device 8, pipe 103 to the left hand end of the check valve device 82 causing the usual valve therein to be shifted toward the right hand, thereby opening communication between pipes 103 and 104 through which the steam supplied to pipe 103 flows to pipe 104, to effect the application of the locomotive driver brakes.

If it is desired to release an independent application of the locomotive steam driver brakes the handle 18 of the independent brake valve device 8 is moved to release position. In this position the cavity 76 in the rotary valve 17 establishes communication between pipe 103 and the exhaust passage and pipe 115, as shown in Figs. 3 and 4 of the drawings. At the same time the rotary valve 17 blanks supply pipe 75 as will be obvious from inspection of Fig. 4 of the drawings. With the independent brake valve device in release position steam is vented from the steam brake cylinder 11 by way of pipe 104, through check valve device 82, pipe 103, cavity 76 in the rotary valve 17 and passage and pipe 115 to the atmosphere, thereby effecting a release of the locomotive driver brakes.

If the locomotive driver and tender brakes as well as the train brakes are applied lightly by an automatic brake application and it is desired to increase the braking force on the locomotive driver brakes without effecting the tender brakes on the locomotive or the train brakes, the handle 18 of the independent brake valve device 8 is moved to application position. In this position steam under pressure is supplied to the brake cylinder 11, as above described, to increase the pressure therein, the increase in pressure resulting in increased braking force on the driver wheels of the locomotive. Since there is no change in the pressure of fluid in the brake pipe 4 and consequently in the chamber 89 of the pneumatic relay valve device 80, there will be no increase in the braking force on the tender wheels of the locomotive or on the cars throughout the train.

EMBODIMENT SHOWN IN FIG. 5

The equipment shown in Fig. 5 differs from that shown in Fig. 3 in that the usual well known locomotive distributing valve device 120 is employed instead of the pneumatic relay valve device 80 for controlling the operation of the steam relay valve device 81 and tender brake cylinder 83.

As shown, the steam relay valve device 81 is identical with that shown in Fig. 3 and all of the parts thereof are designated by corresponding reference characters.

Since the operation of the distributing valve device and its control to supply and release fluid under pressure to effect the operation of the locomotive brakes is so well known the following description will be limited to that part of the equipment which directly involves the invention.

When it is desired to effect an application of the brakes on the locomotive and on the cars throughout a train, with the equipment shown in this embodiment of the invention, the pressure of fluid in the brake pipe 4 and consequently in a brake pipe branch pipe 121 is reduced in the usual well known manner. In response to the reduction of the pressure of fluid in the brake pipe 4 and connected branch pipe 121, the distributing valve 120 operates in the usual manner to supply fluid under pressure from the main reservoir 1 to the brake cylinder control pipe 92, by way of main reservoir pipe 122 and through the usual ports and passages in the distributing valve device 120.

Fluid supplied to the brake cylinder control pipe 92 flows to the chamber 100 of the steam relay valve device 81, causing the piston 95 and the associated valve mechanism to function, as hereinbefore described in connection with Fig. 3 of the drawings, to supply steam under pressure from the steam supply chamber 113 of the relay valve device 81 to the brake cylinder 11. In this embodiment of the invention the communication from chamber 101 of the relay valve device to the brake cylinder 11 is established by way of a pipe 123 thereby effecting an application of the steam brakes on the driver wheels of the locomotive. At the same time, fluid under pressure supplied to pipe 92 flows to the connected pipe 116 and consequently to the brake cylinder 83, thus effecting an application of the pneumatic brakes on the tender.

When it is desired to release the brakes on the locomotive and the brakes on the cars throughout a train, the pressure of fluid in the brake pipe 4 is increased, which causes the distributing valve device 120 to move to release position, in the usual manner. With the distributing valve device 120 in release position, fluid under pressure in the brake cylinder control pipe 92 is vented to the atmosphere. When this occurs the chamber 100 of the steam relay valve device 81 will be vented and as a result the piston 95 and associated valve mechanism will move to their release position in which they are shown in Fig. 5 of the drawings. When in this position steam is released from the driver brake cylinder 11 to the atmosphere by way of pipe 123 and through the relay valve device 81 in the same way as before described in connection with Fig. 3 of the drawings. Since the tender brake cylinder 83 is connected to the pipe 92, by way of pipe 116, the fluid under pressure acting therein is also vented to the atmosphere.

If it is desired to release the brakes on the locomotive independently of those on the train, the usual control element (not shown) for this purpose is manipulated to effect operation of the distributing valve device 120 to cause a release of fluid under pressure from the brake cylinder control pipe 92 in the usual manner. When this occurs both the pneumatic tender brakes and the steam driving wheel brakes on the locomotive will be released, as above described and the train brakes in this case will remain applied.

If it is desired to effect an independent application of the brakes on the locomotive or to reapply the locomotive brakes after effecting an independent release thereof, the distributing valve device is operated in the usual manner to supply fluid under pressure to the brake cylinder control pipe 92, which as before described causes an application of both the pneumatic tender brakes and the steam brakes.

If it is desired to increase the locomotive brakes without increasing the train brakes or if it is desired to retain the locomotive brakes while releasing the train brakes it may be accomplished in the usual manner.

While three embodiments of the improved brake control means have been illustrated and described in detail, it should be understood that the invention is not limited to these details of construction, and that numerous changes and modifications may be made without departing from the scope of the following claims.

Having now described my invention, what I claim as new and desire to secure by Letters Patent is:

1. In a vehicle brake system, in combination, a brake pipe normally charged with air under pressure, a brake cylinder, a steam pressure supply source, air pressure responsive means operative to supply steam from said source to the brake cylinder to effect an application of the brakes, and means responsive to a reduction in brake pipe pressure for supplying air under pressure to effect the operation of said air responsive means to its steam supplying position.

2. In a vehicle brake system, in combination, a brake pipe normally charged with air under pressure, a brake cylinder, a steam pressure supply source, a steam valve operative to supply steam from said source to the brake cylinder to effect an application of the brakes, air pressure responsive means for controlling said steam valve, and means responsive to a reduction in brake pipe pressure for supplying air under pressure to effect the operation of said air responsive means to operate said steam valve to its steam supply position.

3. In a vehicle brake system, in combination, a brake pipe normally charged with air under pressure, a brake cylinder, a steam pressure supply source, a supply valve normally maintained closed and adapted when open to supply steam from said source to the brake cylinder to effect an application of the brakes, means defining a chamber, a said chamber being normally vented to the atmosphere, a movable abutment responsive to an increase in air pressure in said chamber for opening said valve, and means responsive to a reduction in brake pipe pressure for supplying fluid under pressure to said chamber to effect an increase in air pressure in said chamber.

4. In a vehicle brake system, in combination, a brake pipe normally charged with air under pressure, a brake cylinder, a steam pressure supply source, a supply valve normally maintained closed and adapted when open to supply steam from said source to the brake cylinder to effect an application of the brakes, a first chamber normally connected to the atmosphere and a second chamber normally connected to the atmosphere, a movable abutment responsive to an increase in air pressure in said first chamber for opening said valve, and operative upon an increase in steam pressure in said second chamber in predetermined relation to the air pressure in the first chamber for closing said valve, and means responsive to variations in brake pipe pressure for determining the pressure of air in said first chamber.

5. In a vehicle brake system, in combination, a brake pipe normally charged with air under pressure; a brake cylinder; a steam pressure supply source; a valve device having a chamber, a valve mechanism, and a movable abutment for controlling said valve mechanism, said abutment and mechanism having an application position for supplying steam from said source to the brake cylinder to effect an application of the brakes and being movable to said position when air under pressure is supplied to said chamber and having a release position for releasing steam from the brake cylinder to the atmosphere to effect a release of the brakes, and being movable to said release position when air under pressure is released from said chamber; and means including a valve mechanism responsive to variations in brake pipe pressure for controlling the pressure of air in said chamber.

6. In a vehicle brake system, in combination, a brake pipe normally charged with air under pressure, a brake cylinder, a steam pressure supply source, air pressure responsive means operative to supply steam from said source to the brake cylinder to effect an application of the brakes and means responsive to a reduction in brake pipe pressure for supplying air under pressure to effect the operation of said air responsive means to its steam supplying position, and other means comprising a valve having one position for establishing a by-pass communication around said air responsive means to supply steam from said source to the brake cylinder independently of the air responsive means to effect an application of the brakes.

7. In a vehicle brake system, in combination, a brake pipe normally charged with air under pressure, a brake cylinder, a steam pressure supply source, air pressure responsive means operative to supply steam from said source to the brake cylinder to effect an application of the brakes, and means responsive to a reduction in brake pipe pressure for supplying air under pressure to effect the operation of said air responsive means to its steam supplying position, and an independent brake valve device having a release position for establishing a communication between the brake cylinder and the atmosphere to effect a release of the brakes and an application position for establishing a by-pass communication around said air responsive means for supplying steam from said source to the brake cylinder to effect an application of the brakes.

8. In a vehicle brake system, in combination, a brake pipe normally charged with air under pressure, a brake cylinder, a steam pressure supply source, a steam valve operative to supply steam from said source to the brake cylinder to effect an application of the brakes, air pressure responsive means for controlling said steam valve, and means responsive to a reduction in brake pipe pressure for supplying air under pressure to effect the operation of said air responsive means to operate said steam valve to its steam supply position, and independent valve means having a normal position in which the brake cylinder is connected to the atmosphere to effect a release of the brakes and having another position in which the brake cylinder is disconnected from the atmosphere and in which the steam pressure supply source is connected to the brake cylinder to permit steam to flow to the brake cylinder independently of said steam valve to effect an application of the brakes.

9. In a vehicle brake system, in combination, a brake pipe normally charged with air under pressure, a brake cylinder, a steam pressure supply source, air pressure responsive means operative to supply steam from said source to the brake cylinder to effect an application of the brakes, and means responsive to a reduction in brake pipe pressure for supplying air under pressure to effect the operation of said air responsive means to its steam supplying position, an automatic brake valve device for effecting reductions in brake pipe pressure, and an independent brake valve device having a position in which steam may be supplied to the brake cylinder independently of the air pressure responsive means for effecting an application of the brakes.

10. In a vehicle brake system, in combination, a brake cylinder supply pipe to which steam is supplied to effect an application of the brakes and from which steam is released to effect a release of the brakes, an air pressure responsive means operative for supplying steam to and for controlling the release of steam from said brake cylinder supply pipe, a first brake valve device for supplying steam to and for controlling the release of steam from said brake cylinder control pipe independently of said air pressure responsive means, and means including a second brake valve device for effecting operation of the air pressure responsive means.

11. In a vehicle brake system, in combination, a brake pipe normally charged with air under pressure; a brake cylinder; a steam pressure supply source; a valve device having a chamber, a valve mechanism, and a movable abutment for controlling said valve mechanism, said abutment and mechanism having an application position in which steam is supplied from said source to the brake cylinder to effect an application of the brakes and movable to said position when air under pressure is supplied to said chamber, and having a release position in which steam is released from the brake cylinder to the atmosphere to effect a release of the brakes and movable to said release position when air under pressure is released from said chamber; means including a brake controlling valve device responsive to variations in brake pipe pressure for controlling the pressure of air in said chamber; an automatic brake valve device having an application position for effecting operation of said means to supply air to said chamber and a release position for effecting operation of said means to release air from said chamber, and a manually operated valve device for releasing air from said chamber independently of the operation of said automatic brake valve device to its release position.

12. In a vehicle brake system, in combination, a brake pipe normally charged with air under pressure, a brake cylinder, a steam pressure supply source, air pressure responsive means operative to supply steam from said source to the brake cylinder to effect an application of the brakes, means responsive to a reduction in brake pipe pressure for supplying air under pressure to effect the operation of said air responsive means to its steam supplying position, and an independent brake valve device having one position for establishing a steam supply communication from said source to the brake cylinder when said air responsive means is in its steam supplying position and having another position for closing said communication and establishing another communication for by-passing steam around said air responsive means to the brake cylinder to effect an application of the brakes.

13. In a vehicle brake system, in combination, a brake pipe normally charged with air under pressure, a brake cylinder, a steam pressure supply source, air pressure responsive means operative to supply steam from said source to the brake cylinder to effect an application of the brakes, and means responsive to a reduction in brake pipe pressure for supplying air under pressure to effect the operation of said air responsive means to its steam supplying position, an automatic brake valve device for effecting reduction in brake pipe pressure, and an independent brake valve device having one position in which a steam supply communication from said air responsive means to said brake cylinder is established and a different position in which steam may be supplied to the brake cylinder independently of the air pressure responsive means, for effecting an application of the brakes.

14. In a vehicle brake system, in combination, a brake pipe normally charged with air under pressure, a brake cylinder, a steam pressure supply source, air pressure responsive means operative to supply steam from said source to the brake cylinder to effect an application of the brakes, and means responsive to a reduction in brake pipe pressure for supplying air under pressure to effect the operation of said air responsive means to its steam supplying position, a communication through which steam may flow from said air pressure responsive means to the brake cylinder, a brake valve device interposed in the steam communication from said air responsive means to the brake cylinder and being operative to one position to open said communication and being operative to another position to close said communication and to establish a direct communication through which steam is supplied directly to the brake cylinder independently of the air responsive means.

15. In a vehicle brake system, in combination, a brake cylinder, a brake cylinder supply pipe through which steam is supplied to the brake cylinder to effect an application of the brakes and from which steam is released to effect a release of the brakes, an air pressure responsive means operative for supplying steam to and for controlling the release of steam from the brake cylinder supply pipe, a brake valve device for also supplying steam to and for controlling the release of steam from the brake cylinder supply pipe, and a valve device responsive to the pressure of steam supplied by the air pressure responsive means for closing communication between the brake cylinder and the brake valve device and responsive to the pressure of steam supplied by the brake valve device for closing communication between the brake cylinder and the air pressure responsive means.

16. In a vehicle brake system, in combination, a brake pipe normally charged with air under pressure, a brake cylinder, a steam pressure supply source, air pressure responsive means operative to supply steam from said source to the brake cylinder to effect an application of the brakes, means responsive to a reduction in brake pipe pressure for supplying air under pressure to effect the operation of said air responsive means to its steam supplying position, an independent brake valve device having a release position for establishing a communication between the brake cylinder and the atmosphere to effect a release of the brakes, and an application position for establishing a by-pass communication around said air responsive means for supplying steam from said source to the brake cylinder to effect an application of the brakes, and a check valve device operative when the brake application has been effected by the air pressure responsive means for rendering the independent brake valve device when in its release position ineffective to release the brakes.

17. In a vehicle brake system, in combination, a brake pipe, air pressure brake apparatus including a train brake pipe normally charged with air under pressure, a steam pressure supply source, a steam brake cylinder, air pressure responsive means operative to supply steam from said source to the brake cylinder to effect an application of the brakes, valve means for controlling the operation of the air pressure responsive means.

said valve means comprising a chamber and being operative upon an increase in air pressure in said chamber to effect the operation of said air responsive means to its steam supplying position, a normally charged reservoir, an equalizing valve means subject to the opposing pressures of air in said brake pipe and in said reservoir and operative upon a reduction in brake pipe pressure to supply air under pressure from said reservoir to said chamber.

18. In a vehicle brake system comprising, in combination, steam brakes and air brakes, a steam brake cylinder and an air brake cylinder, a source of steam pressure, a source of air pressure, a first air pressure responsive means operative to supply steam from said source of steam pressure to the steam brake cylinder to effect an application of the steam brakes, a second air pressure responsive means operative to supply air from said source of air pressure to the air brake cylinder to effect an application of the air brakes and to also supply air under pressure to effect the operation of said first air pressure responsive means to its steam supplying position, and means responsive to a reduction in brake pipe pressure for supplying air under pressure for effecting operation of the second air responsive means to its air supplying position.

19. In a vehicle brake system comprising, in combination, steam brakes and air brakes, a steam brake cylinder and an air brake cylinder, a source of steam pressure, a source of air pressure, a first air pressure responsive means operative to supply steam from said source of steam pressure to the steam brake cylinder to effect an application of the steam brakes, a second air pressure responsive means operative to supply air from said source of air pressure to the air brake cylinder to effect an application of the air brakes and to also supply air under pressure to effect the operation of said first air pressure responsive means to its steam supplying position, and means responsive to a reduction in brake pipe pressure for supplying air under pressure for effecting operation of the second air responsive means to its air supplying position, an automatic brake valve device for effecting a reduction in brake pipe pressure, and an independent brake valve device having an application position for establishing a by-pass communication around the first air pressure responsive means for supplying steam from said source of steam pressure to the steam brake cylinder to effect an application of the steam brakes independently of the air brakes.

20. In a vehicle brake system comprising, in combination, steam brakes and air brakes, a steam brake cylinder and an air brake cylinder, a source of steam pressure, a source of air pressure, a first air pressure responsive means operative to supply steam from said source of steam pressure to the steam brake cylinder to effect an application of the steam brakes, a second air pressure responsive means operative to supply air from said source of air pressure to the air brake cylinder to effect an application of the air brakes and to also supply air under pressure to effect the operation of said first air pressure responsive means to its steam supplying position, and means responsive to a reduction in brake pipe pressure for supplying air under pressure for effecting operation of the second air responsive means to its air supplying position, an automatic brake valve device for effecting a reduction in brake pipe pressure, and an independent brake valve device having an application position for establishing a by-pass communication around the first air pressure responsive means for supplying steam from said source of steam pressure to the steam brake cylinder to effect an application of the steam brakes independently of the air brakes, and having a release position in which steam in the steam brake cylinder may be released through said by-pass communication to the atmosphere.

21. In a vehicle brake system, comprising steam brakes and air brakes, in combination, a steam brake cylinder and an air brake cylinder, a source of steam pressure, a source of air pressure, air pressure responsive means operative to supply steam from said source of steam pressure to the steam brake cylinder to effect an application of the steam brakes, means responsive to a reduction in brake pipe pressure for supplying air under pressure to the air brake cylinder to effect an application of the air brakes and to also supply air under pressure to the pressure responsive means for effecting operation of said air pressure responsive means to its steam supplying position.

22. In a combined air brake and steam brake system, in combination, a train brake pipe normally charged with air under pressure, a steam brake cylinder, an air brake cylinder, a source of steam pressure, a source of air pressure, means for supplying steam from said source of steam pressure to said brake cylinder, and a valve device responsive to a reduction in brake pipe pressure adapted to supply fluid under pressure to said means for controlling the operation of the means to supply steam from said source of steam pressure to the steam brake cylinder and for controlling the supply of air under pressure from said source of air pressure to the air brake cylinder, to effect an application of both the steam and the air brakes.

23. In a vehicle brake system, in combination, a brake pipe normally charged with air under pressure, an air brake cylinder, a source of air under pressure, a steam brake cylinder, a source of steam pressure, air pressure responsive means operative to supply steam from said source of steam pressure to the brake cylinder to effect an application of the steam brakes, and a distributing valve device responsive to a reduction in brake pipe pressure for supplying air under pressure from said source of air under pressure to effect operation of said air responsive means to its steam supplying position and for also supplying air under pressure from said source of air under pressure to the air brake cylinder to effect an application of the air brakes.

24. In a locomotive air brake system comprising a train brake pipe normally charged with air under pressure, an air brake cylinder, a main reservoir, a distributing valve device operative upon a reduction in brake pipe pressure for supplying air under pressure from the main reservoir to said brake cylinder to effect an application of the brakes, in combination, a steam brake cylinder, a source of steam pressure, a steam supply valve operative to supply steam from said source of steam pressure to the brake cylinder to effect an application of the steam brakes, air pressure responsive means having a movable abutment subject to the pressure of air in the air brake cylinder and operative upon effecting an application of the air brakes to operate said steam supply valve to its steam supply position.

CLYDE C. FARMER.